United States Patent
Elardo et al.

(10) Patent No.: US 12,546,410 B2
(45) Date of Patent: Feb. 10, 2026

(54) APPARATUS FOR AUTOMATICALLY CONTROLLING THE FLOW RATE OF A FLUID FLOWING ALONG A DUCT AND REFRIGERATION OR COOLING SYSTEM COMPRISING THE AFORESAID APPARATUS

(71) Applicant: Belimo Holding AG, Hinwil (CH)

(72) Inventors: Davide Elardo, Rubano (IT); Luca Pauletti, Bagnatica (IT); Lorenzo Bolognese, Copparo (IT)

(73) Assignee: BELIMO HOLDING AG, Hinwil (CH)

( * ) Notice: Subject to any disclaimer, the term of this patent is extended or adjusted under 35 U.S.C. 154(b) by 342 days.

(21) Appl. No.: 18/256,970

(22) PCT Filed: Dec. 10, 2021

(86) PCT No.: PCT/IB2021/061574
§ 371 (c)(1),
(2) Date: Jun. 12, 2023

(87) PCT Pub. No.: WO2022/130149
PCT Pub. Date: Jun. 23, 2022

(65) Prior Publication Data
US 2024/0052941 A1     Feb. 15, 2024

(30) Foreign Application Priority Data
Dec. 15, 2020   (IT) ................. 102020000030794

(51) Int. Cl.
*F16K 31/04*   (2006.01)
*H02P 8/02*    (2006.01)
*H02P 8/22*    (2006.01)

(52) U.S. Cl.
CPC .............. *F16K 31/042* (2013.01); *H02P 8/02* (2013.01); *H02P 8/22* (2013.01)

(58) Field of Classification Search
CPC . F16K 31/042; H02P 8/02; H02P 8/22; Y02B 30/70
See application file for complete search history.

(56) References Cited

U.S. PATENT DOCUMENTS 4,157,159 A * 6/1979 Modes ............... G05D 23/1854
                                                    236/87
4,951,549 A   8/1990 Olsen et al.
(Continued)

FOREIGN PATENT DOCUMENTS

CN    106959611 A    7/2017
WO    2006092026 A1  9/2006

OTHER PUBLICATIONS

International Search Report and Written Opinion for Corresponding International Application No. PCT/IB2021/061574, 15 pages, Mar. 18, 2022.

*Primary Examiner* — Kidest Worku
(74) *Attorney, Agent, or Firm* — LUCAS & MERCANTI, LLP

(57) ABSTRACT

An apparatus for automatically controlling the flow rate of a fluid (FR) flowing along a duct is disclosed, including a valve element provided with an obturator interposed along a section of the duct a servo-motor connected to the obturator to allow displacement thereof, and an electronic control unit connected to the servo-rotor configured to generate an output signal supplied to the servo-motor. The apparatus also includes an electronic interface module connected to the electronic control unit and external electronic control means. The electronic interface module converts the input signal received by the external electronic control means into an
(Continued)

intermediate signal and the electronic control unit converts the intermediate signal into the output signal.

9 Claims, 2 Drawing Sheets

(56) References Cited

U.S. PATENT DOCUMENTS

| | | | | |
|---|---|---|---|---|
| 5,517,100 | A | * | 5/1996 | Matsubara ............ G05B 19/19 |
| | | | | 318/632 |
| 2005/0039807 | A1 | * | 2/2005 | Ford .................. F15B 13/0828 |
| | | | | 137/884 |
| 2011/0079739 | A1 | * | 4/2011 | Schiavone ........... F04B 49/065 |
| | | | | 251/129.01 |
| 2011/0266473 | A1 | | 11/2011 | Santinanavat et al. |
| 2014/0353391 | A1 | * | 12/2014 | Burklin .................. F25B 41/35 |
| | | | | 236/92 B |
| 2018/0043748 | A1 | | 2/2018 | Kuribayashi |
| 2018/0347720 | A1 | | 12/2018 | Mariano |
| 2019/0390883 | A1 | * | 12/2019 | Ronga .................... F25B 45/00 |

\* cited by examiner

APPARATUS FOR AUTOMATICALLY CONTROLLING THE FLOW RATE OF A FLUID FLOWING ALONG A DUCT AND REFRIGERATION OR COOLING SYSTEM COMPRISING THE AFORESAID APPARATUS

CROSS-REFERENCE TO RELATED APPLICATIONS

This application is a 371 of PCT/IB2021/061574, filed Dec. 10, 2021, which claims the benefit of Italian Patent Application No. 102020000030794, filed Dec. 15, 2020.

FIELD OF THE INVENTION

The present invention relates to an apparatus for automatically controlling the flow rate of a fluid flowing along a duct.

The present invention also relates to a refrigeration or cooling system comprising the aforesaid apparatus.

BACKGROUND OF THE INVENTION

As known, in the refrigeration and cooling system sectors, refrigeration circuits are used that provide the use of an expansion valve which adjusts the refrigerant fluid entering the evaporator, depending on the overheating detected at the evaporator outlet.

To date, they are known mechanical devices for controlling the evaporator overheating, operated by means of a sensing bulb and a pneumatic diaphragm actuator, or electronic devices, with a valve operated by means of a stepper actuator which is in turn driven by electronic control means, usually called "drivers", which acquire the pressure and temperature values of the fluid and generate a control signal for the above-mentioned stepper actuator in order to maintain these values within a given set-point.

In other words, this type of electronic control is of the feedback type or is also known as "closed loop".

With regard to the control signal generated by the aforesaid electronic control means, in the case of bipolar stepper actuators, i.e. comprising two driving phases, it can be of three different types, i.e. of the so-called Microstepping type, the Full-step type and the Half-step type.

Currently, most of the electronic control means on the market use Microstepping, and to a lesser extent the other two types.

In any case, all three of these types of control signal, which incidentally is an electrical current signal, are characterised in that they allow the variation of the movement of the stepper actuator according to a unit of measurement defined as "step".

Each stepper actuator, in fact, is characterised by a predetermined maximum number of steps.

It is also known that the aforesaid control devices are based on the use of valves available on the market of the "seat and obturator" type. Such control devices, although well-known and widespread, have certain drawbacks.

A first drawback is linked to the use of such seat and obturator valves, which, when closed, do not ensure the perfect sealing of the refrigerant, with consequent fluid leakage to the evaporator and risk of compressor breakage on restarting.

For some applications it is necessary to add a shut-off valve in series, resulting in increasing costs due to a component being added and the subsequent management thereof.

A second drawback of the seat and obturator valves is that they have a "step" minimum flow rate for the first opening of the obturator, due to the area of the circular crown which is uncovered by the obturator at its smallest deviation: the size of the circular crown, and therefore of the minimum flow rate, is linked to the size of the passage hole and of the obturator; such step affects the continuity of regulation, and therefore the optimisation of the operation of the control system.

A further disadvantage of seat and obturator valves is that they are more susceptible to fouling (insertion of impurities between obturator and seat) and ice formation between movable and fixed elements.

Another disadvantage of seat and obturator valves is that the difference in pressure acting inside the valve mechanically stresses the stem that moves the obturator, affecting its service life.

Moreover, a further disadvantage of the electronic expansion valves currently used is that they do not provide any feedback on the actual position of the obturator, so any blockages are not detectable.

The present invention aims to overcome all the above-mentioned drawbacks of the prior art.

SUMMARY OF THE INVENTION

In particular, it is an object of the present invention to make an apparatus for automatically controlling the flow rate of a fluid flowing along a duct, which allows to use a valve element with better performance than the valves currently used in refrigeration circuits.

In particular, the object of the invention is to make an aforesaid apparatus which allows to use and control a valve element with no leakage, with short manoeuvring times, capable of operating with high differential pressures and with low pressure drops.

A further object of the invention is to make an apparatus enabling expansion valves previously present in a pre-existing refrigeration circuit to be replaced easily and quickly by an operator.

In particular, the object of the invention is to make an apparatus which can be easily interfaced with the electronic control means already present in a pre-existing refrigeration circuit, and which does not require any type of setting after installation thereof nor any variation of the setting parameters of the same electronic control means already present.

In other words, the object of the invention is to make an apparatus which enables control devices on a pre-existing refrigeration circuit to be replaced or integrated in a way which is completely transparent to an operator.

A further object of the invention is to make an apparatus capable of interfacing automatically with a wide variety of electronic control means already present in pre-existing refrigeration circuits.

The aforesaid objects are achieved by an apparatus for automatically controlling the flow rate of a fluid flowing along a duct, according to claim 1.

Further detailed features of the invention are given in the dependent claims.

The aforesaid objects are also achieved by a refrigeration or cooling system as described herein.

Advantageously, the technique of the invention makes it possible to reduce the time and cost of replacing expansion valves in a pre-existing refrigeration circuit.

Further, still advantageously, the technique of the invention makes it possible to reduce the start-up time of the pre-existing refrigeration circuit after such replacement and makes it possible to avoid any malfunctioning of the circuit after such replacement due to errors or inaccuracies in the setting of the parameters of such new control apparatus.

A further advantage obtained by the control apparatus of the invention is its compactness and integrability, facilitating its installation in pre-existing refrigeration circuits.

BRIEF DESCRIPTION OF THE DRAWINGS

The aforesaid objects and advantages, together with others that will be mentioned hereinafter, will appear as clear during the description of a preferred embodiment of the invention, which is given by way of non-limiting example with reference to the accompanying drawings, where.

Figure 1:
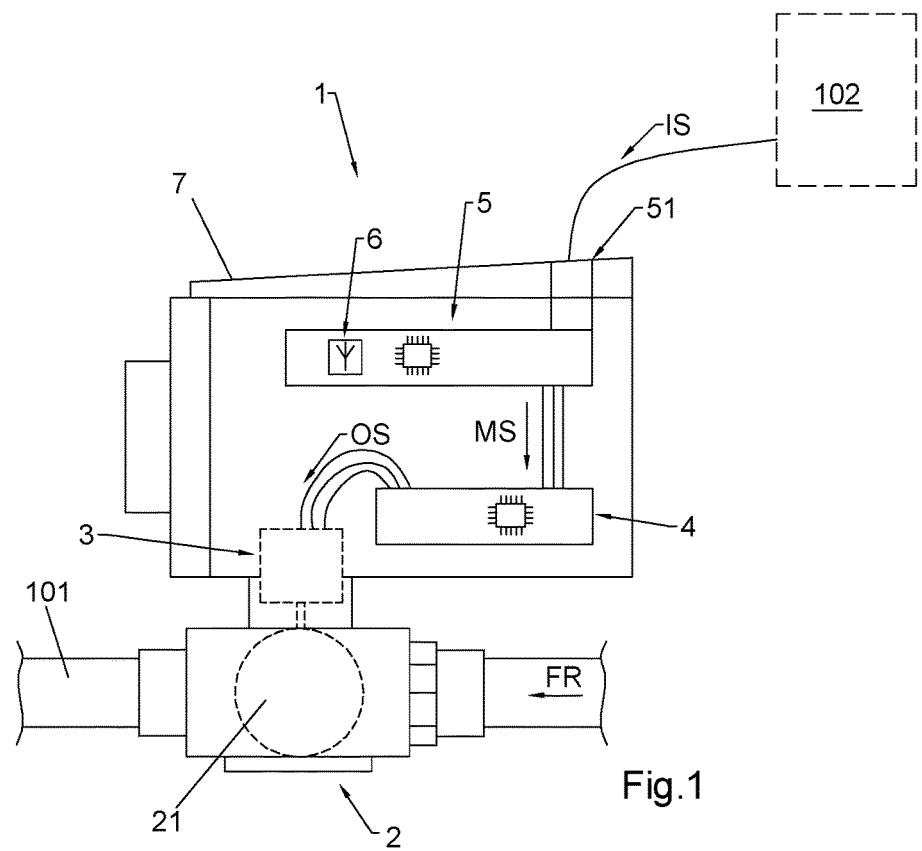
FIG. 1 schematically represents a first embodiment of the apparatus of the invention.

The apparatus of the invention for automatically controlling the flow rate of a fluid flowing along a duct is shown in FIG. 1, where it is collectively referred to as 1.

DETAILED DESCRIPTION OF THE INVENTION

According to the preferred embodiment of the invention described herein, preferably but not necessarily, such apparatus 1 is adapted to be applied to a refrigeration circuit of a refrigeration or cooling system, in order to automatically control the flow rate of the refrigerant fluid entering the evaporator, in order to maintain the pressure and temperature values of the same fluid within a certain set-point.

It is not excluded, however, that such an apparatus 1 may be used in other types of systems where it is however necessary to regulate the flow rate of a generic fluid flowing along a duct of such system.

Such apparatus 1 comprises a valve element 2 adapted to be interposed along a section of the aforesaid duct and comprising an obturator 21 configured to vary its position between a first end position for completely intercepting the fluid, preventing it from flowing through the same duct, and a second end position of complete opening, allowing the same fluid to flow freely along the duct.

According to the preferred embodiment of the invention, the obturator 21 of such valve element 2 is a ball obturator, thereby avoiding all of the drawbacks described above due to the use of "seat and obturator" type obturators used in known control devices.

The apparatus 1 further comprises a direct current servo-motor 3 operatively connected to the aforesaid obturator 21, so as to allow positioning the obturator 21 itself between the aforesaid first end position and second end position.

Furthermore, the apparatus 1 of the invention comprises an electronic control unit 4, operatively connected to the servo-motor 3 and configured to generate an output signal OS for driving the servo-motor 3 itself. Such an output signal OS, in particular, is adapted for positioning the obturator 21 in a specific first desired position.

The type of the aforesaid output signal OS, for controlling the movement of the servo-motor 3, is of the type known in itself, provided that it is suitable for properly driving the movement of the aforesaid servo-motor 3, in order to position the obturator 21 at the aforesaid specific first position.

According to the invention, the apparatus 1 comprises an electronic interface module 5 operatively connected to the electronic control unit 4 and comprising an electrical input connector 51, which is in turn configured to be connected with external electronic control means 102, adapted to generate at least one input signal IS, for driving stepper motors intended to move valve element obturators for controlling the flow of a fluid in a duct. In particular, such input signal IS, generated by the aforementioned external electronic control means 102, is adapted for positioning an obturator in a specific second position.

The electronic interface module 5, according to the invention, is configured to convert said input signal IS into an intermediate signal MS placed as input to the electronic control unit 4, which, in turn, is configured to convert said intermediate signal MS into the output signal OS, so that the specific first position to which the obturator 21 is to be taken substantially corresponds to the specific second position imposed by the input signal IS.

Such proposed solution therefore makes it possible to advantageously replace valve elements used in pre-existing refrigeration circuits, without having to modify the electronic control means 102 already present in the aforesaid circuit and suitably set up to control the positioning of the obturator of the aforesaid valve element by means of stepper motors.

In other words, advantageously, such a feature of the apparatus 1 of the invention allows to exploit and suitably adapt the control input signals IS for stepper motors intended to move valve element obturators, for controlling a servo-motor 3, in turn configured to suitably move the obturator 21 of the valve element 2 of the same apparatus 1 in the specific position for which said input signal IS had been generated.

As regards the input signals IS, which are to be received as input and converted by the electronic interface module 5, they are two electrical current signals F1S and F2S for driving the first phase and second phase of bipolar stepper motors. In particular, these electrical current signals F1S and F2S can be of the Half-step, Full-step or Microstepping type.

According to the invention, with respect to the intermediate signal MS, it has a specific value within a range between a predetermined minimum value, associated with the first end position, and a predetermined maximum value, associated with the second end position. In particular, such specific value represents, in a proportional manner within said range, the specific second position for which the input signal IS was generated by the electronic control means 102.

Preferably, but not necessarily, the specific value of the intermediate signal MS is a pure digital value between the 0 value, associated with said first end position, and a predetermined maximum value, associated with the second end position. In the example described herein, such maximum preset value is selected as 10000, since the intermediate signal MS is placed at the input of an electronic control unit 4 of actuator devices produced and sold by BELIMO Holding AG®, which provide, among the various possibilities, to receive as input, precisely, a digital signal whose value, proportional to the position to be taken by the obturator, is expressed by a pure number between 0 and 10000, according to the MPBus Belimo® communication protocol.

It is not excluded, however, that according to a different embodiment of the invention, depending on the type of signal required as input by a different electronic control unit configured to control the servo-motor, the value of said intermediate signal MS may be a direct current voltage signal between a 0-Volt value, associated with said first end position, and a maximum predetermined value of electrical voltage expressed in Volt, such as 10 Volt, associated with said second end position.

Further, it is not excluded that said intermediate signal MS may be an electrical current signal within a certain range of values, provided that said intermediate signal MS may be properly interpreted by the electronic control unit 4 placed downstream of the electronic interface module 5, as an indicator of the aforesaid specific second position, for which the input signal IS was generated by the external electronic control means 102, in order to properly generate, by the electronic control unit 4 itself, the output signal OS, as seen above.

As specifically regards the electronic interface module 5, it is configured to implement such conversion phase by detecting, from the aforesaid input signal IS, the number of movement steps to be executed and the direction of execution of said movement, in order to place an obturator in the aforesaid specific second position.

Even more specifically, according to the preferred embodiment of the invention, which provides for receiving as input by the electronic interface module 5 the two electrical current signals F1S and F2S, modulated according to the Half-step, Full-step or Microstepping type, as input signals IS, the detection of the aforesaid number of steps and the movement direction is obtained by performing the phases of:

setting a variable, defined in an exemplary manner in this context as step_number, to the value 0;

generating, for each of the electrical current signals F1S and F2S adapted to drive the first phase and the second phase of the above-mentioned bipolar stepper motors, a square wave OQ1 and OQ2 on two levels, defined respectively as low level L and high level H.

In detail, these two square waves OQ1 and OQ2 are generated in such a way that the rising edges and the falling edges of the square waves themselves are determined by the transient of each of the electrical current signals F1S and F2S through the null value, i.e. by a negative value and a positive value respectively.

Figure 2:
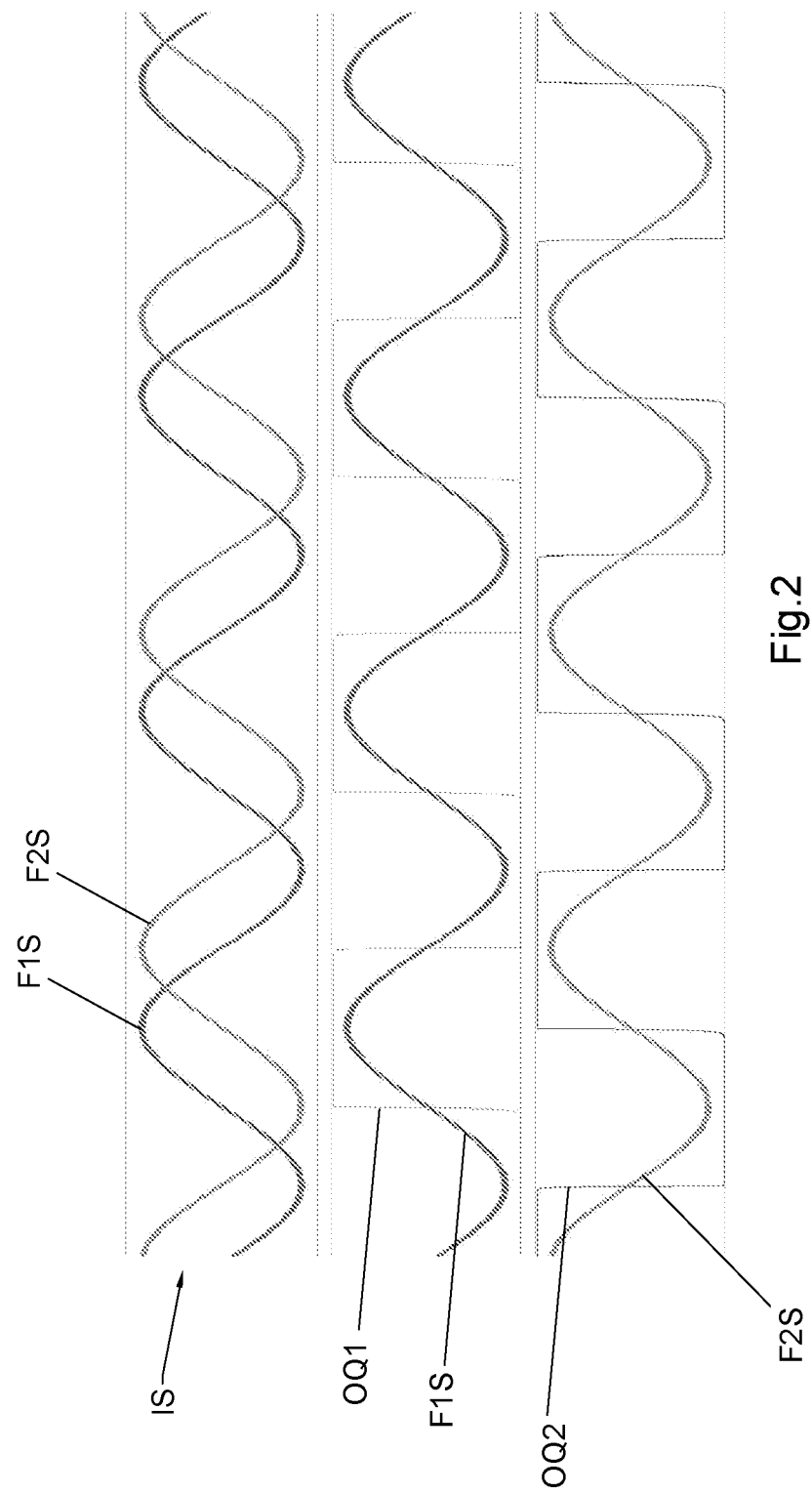
FIG. 2 represents a time graph of an input signal of the Microstepping type and of the two square waves obtained from said input signal according to the implemented procedure of the apparatus of the invention, FIG. 3 schematically represents a refrigeration or cooling system of the invention provided with the apparatus of the invention of FIG. 1.

An example of such a square-wave generating procedure is graphically represented in FIG. 2, where two electrical current signals F1S and F2S for driving the phases of a bipolar stepper motor are shown, where these electrical current signals are of the Microstepping type, clearly out-of-phase with each other.

The detection procedure, following such generation of the square wave OQ1 and OQ2 for each of the two electrical current signals F1S and F2S, involves detecting over time, for each predefined sampling period T, the level assumed by the two square waves OQ1 and OQ2 themselves. According to the invention, such sampling period T is to be chosen in such a way that the sampling frequency 1/T is always equal to or four-fold greater than the fundamental frequency of the electrical current signals F1S and F2S.

Once the sampling has been carried out, the procedure implemented by the electronic interface module 5 provides, for each sampling instant t, to detect the value of the Step based on the combination of the levels of the two square waves OQ1 and OQ2 at the sampling instant t and at the immediately preceding sampling instant t-T, considering the following truth table (TABLE 1):

TABLE 1

| First Phase | Second Phase | Step |
|---|---|---|
| High level H | Low level L | x |
| High level H | High level H | x + 1 |
| Low level L | High level H | x + 2 |
| Low level L | Low level L | x + 3 | where x is a variable whose value is selected from the set of integers Z. For example, the value of x could be selected as 1.

The procedure, subsequently, provides to calculate the result of the subtraction of the Step value at the sampling instant t with the Step value at the immediately preceding sampling instant t-T. In particular, such procedure provides to set as result of this subtraction the value −1 in case the actual result is a positive value of absolute value greater than 1. Similarly, such procedure provides to set as the result of this subtraction the value +1 if the actual result is a negative value of absolute value greater than 1. Both of these special cases occur when the two electrical current signals F1S and F2S are moving between two consecutive periods, in either of the two directions, and correspond to the cases in the below-reported table related to the last two Movement values.

For example, if the two square waves OQ1 and OQ2 were sampled for 8 consecutive values, as shown in the below-reported TABLE 2, and this subtraction operation was carried out for each pair of adjacent sampling instants, the results obtained would be the values shown in the Movement column.

TABLE 2

| Instant | First Phase | Second Phase | Movement |
|---|---|---|---|
| t − 7T | H | L | — |
| t − 6T | H | H | +1 |
| t − 5T | L | H | +1 |
| t − 4T | H | H | −1 |
| t − 3T | L | H | +1 |
| t − 2T | L | L | +1 |
| t − T | H | L | +1 |
| t | L | L | −1 |

After such a subtraction has been carried out by the electronic interface module 5, in case the result is a positive number, the same electronic interface module 5 is configured to set as required movement direction a first movement direction chosen between the two possible movement directions of the servo-motor 3, while in case said result is a negative number, the electronic interface module 5 is configured to set as required movement direction the second of said two movement directions.

According to the preferred embodiment, the first direction, in case of a positive result, is understood to be the movement direction of the servo-motor 3 which enables the displacement of the obturator 21 towards the second end position, i.e. towards an opening of the obturator 21. Clearly, the second direction, in the event that the result of the subtraction is a negative number, corresponds to the movement direction of the servo-motor 3, which brings the obturator 21 towards the first end position, i.e. towards the position of complete interception of the fluid.

It is not excluded, however, that according to an alternative embodiment the association of the directions with the result of the subtraction operation can be exactly opposite to that described above.

In addition, the electronic interface module 5 is configured, if the result of this subtraction is a value other than 0, to increase the step_number variable by one.

Once such detection for a specific input signal IS received by the electronic interface module 5 is completed, the same electronic interface module 5 is configured, according to the preferred embodiment, to perform the conversion of such information into the aforesaid intermediate signal MS, by calculating the absolute position, required for the obturator 21 and expressed in steps, by summing up the value of the step_number variable to the current absolute position in steps of the same obturator 21, wherein such value of the current absolute position has been previously stored, by the same electronic interface module 5, in a variable defined in an exemplary manner in the present context as step_current_position.

Clearly, this sum of the value of the step_number variable to the current absolute position must be executed taking into account the movement direction identified.

The electronic interface module 5 is also configured to update the step_current_position variable following the execution of such summing operation.

Further, the electronic interface module 5 is configured to obtain the value of the absolute position to be assumed by the obturator 21 expressed in a value within the aforesaid range between the predetermined minimum value and the predetermined maximum value. In order to obtain the aforesaid value, the electronic interface module 5 is configured to divide the value of the absolute position in steps by a conversion ratio R, calculated by dividing in turn the maximum number of movement steps, controllable by the external electronic control means 102 by the maximum number of positions controllable by the electronic interface module 5. In particular, with regard to the maximum number of positions controllable by the electronic interface module 5, it depends on the number of bits made available in the aforesaid electronic interface module 5 to represent the information relating to the absolute position of the obturator, i.e. it depends on the resolution of the intermediate signal MS. Therefore, going back to the conversion ratio R, if, for example, the maximum number of movement steps, controllable by the external electronic control means 102, is equal to 480 steps and the aforesaid maximum number of positions controllable by the electronic interface module 5 is 200, the value of R will be equal to 2.4. If, for example, the maximum number of movement steps is 6386 and the maximum number of controllable positions is 10000, the value of R will be 0.639.

As regards the maximum number of movement steps, controllable by the external electronic control means 102, it depends on the type of valve element previously present in the refrigeration circuit where the apparatus 1 of the invention is to be installed.

According to the preferred embodiment of the invention, the electronic interface module 5 is also configured to automatically detect such maximum number of movement steps.

In particular, the electronic interface module 5 is configured to carry out said detection, performing the aforesaid phase of detecting movement steps and said movement direction widely described above, when the external electronic control means 102 perform an initialization phase, which provides generating an input signal IS adapted to control a stepper motor for the complete movement of an obturator from the first end position to the second end position or vice versa.

In fact, it is well known that when almost all existing refrigeration or cooling systems are switched on, the current external electronic control means 102 carry out the aforesaid initialisation phase.

Possibly, such initialisation phase can also be forced by an operator when the system is already in operation.

It is not excluded, however, that, according to an alternative embodiment of the invention, the apparatus 1, in particular the electronic interface module 5, is not configured to automatically detect this maximum number of movement steps, but is configured to store such value after manual input by an operator.

Having clarified these aspects and returning to the conversion procedure, once the value of the absolute position in quanta has been obtained, the electronic interface module 5 is configured to calculate the value of the intermediate signal MS by normalising this value of the absolute position in quanta within the aforesaid range between the predetermined minimum value and the predetermined maximum value.

With regard to the embodiment of the invention discussed herein, this range is between 0 and 10000, as indicated above.

Further, the apparatus 1 of the invention, in particular the electronic interface module 5, is configured to receive as input a feedback signal SF generated by the servo-motor 3 so as to be able to obtain from the latter the exact position assumed by the obturator 21.

Such information can be advantageously used by the same electronic interface module 5 to implement a position correction logic, in the event that the real position assumed by the obturator 21 is not aligned with the position set with the intermediate signal MS.

In addition or alternatively, such feedback signal SF may be made available by the same electronic interface module 5 to external devices, either by wired communication or by wireless communication.

In this regard, according to the preferred embodiment of the invention, the apparatus 1, in particular the electronic interface module 5, is also provided with wireless type communication means 6, preferably with wireless proximity type communication means, still more preferably with a Bluetooth interface.

According to the preferred embodiment of the invention, the apparatus 1 provides an outer casing 7 in which the electronic control unit 4, the electronic interface module 5 and the servo-motor 3 are integrally contained.

It is not excluded, however, that according to variant embodiments of the invention the apparatus 1 may consist of several separable components, for example a first component comprising the valve element 2, the servo-motor 3 and the electronic control unit 4 and a second component, reversibly couplable to the first component, wherein said second component comprises the aforesaid electronic interface module 5.

Figure 3:
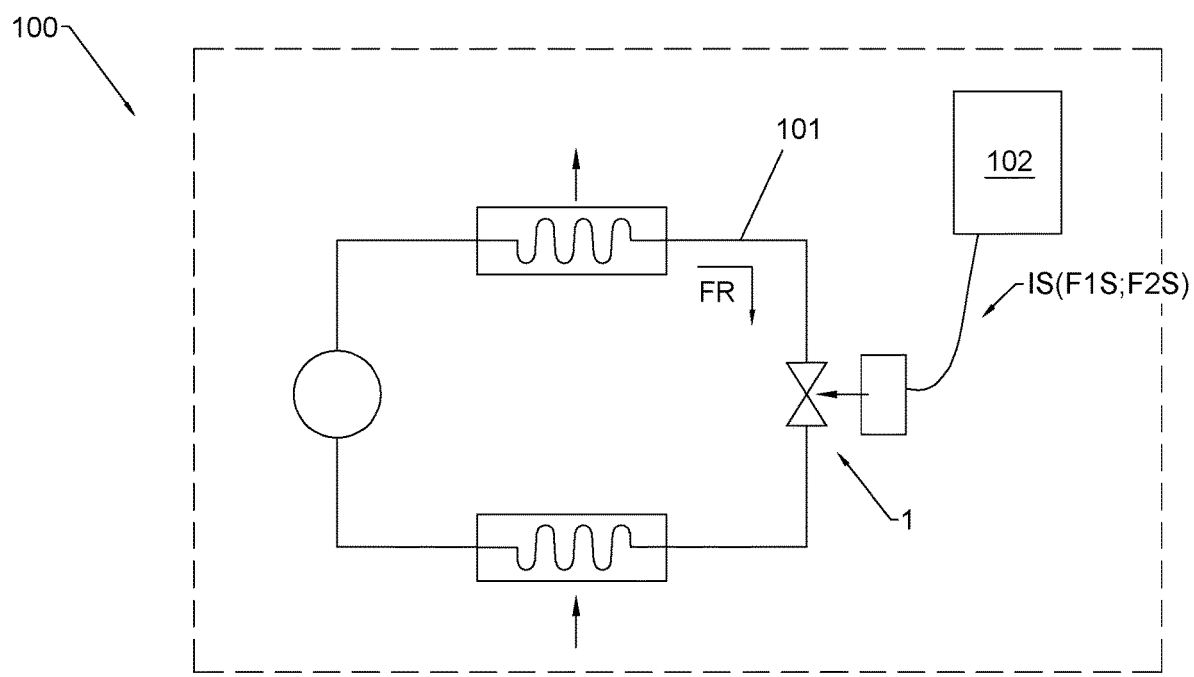

As mentioned above, a refrigeration or cooling system is also part of the invention, schematically shown in FIG. 3 and referred to, in its entirety, as 100. Such system 100 comprises a duct 101 for a refrigerant fluid FR and the aforesaid electronic control means 102 configured to generate at least the aforesaid input signal IS for stepper motors intended to move valve element obturators for controlling the flow of the refrigerant fluid FR in said duct.

According to the invention, such system also comprises the apparatus 1, according to the foregoing, for automatically controlling the flow rate of said refrigerant fluid FR flowing along said duct 101, where the valve element 2 of the apparatus 1 is interposed along a section of the duct 101 and where the electronic interface module 5 is connected, via the electrical input connector 51, with the electronic control means 102.

According to what has been said, therefore, the apparatus of the invention achieves all the intended objects.

In particular, the object to make an apparatus for automatically controlling the flow rate of a fluid flowing along a duct that allows the use of a valve element with better performance than the valves currently used in refrigeration circuits is achieved.

The object to make an apparatus that allows the use and control of a valve element with no leakage, with short operating times, with the ability to operate at high differential pressures and with low pressure drops is also reached.

Another object achieved by the invention is the creation of an apparatus enabling an operator to operate expansion valves previously present in a pre-existing refrigeration circuit easily and quickly.

In particular, an object achieved is the creation of an apparatus which can be easily interfaced with the control elements already present in a pre-existing refrigeration circuit and which does not require any type of setting after having been installed, nor any variation of the setting parameters of the aforesaid electronic control means already present.

In other words, the object to make an apparatus that allows the control devices present on a pre-existing refrigeration circuit to be replaced or integrated in a way that is completely transparent to an operator is achieved.

Last but not least, the object to make an apparatus capable of interfacing automatically with a wide variety of electronic control means already present in pre-existing refrigeration circuits has been achieved.

The invention claimed is:

1. An apparatus for automatically controlling the flow rate of a fluid flowing along a duct, comprising:
   a valve element adapted to be interposed along a section of said duct and comprising an obturator configured to vary its position between a first end position of complete interception of said fluid and a second end position of complete opening;
   a direct current servo-motor operatively connected to said obturator to allow positioning said obturator between said first end position and said second end position;
   an electronic control unit operatively connected to said servo-motor and configured to generate an output signal to be provided to said servo-motor, said output signal being adapted for positioning said obturator in a specific first position;
   an electronic interface module operatively connected to said electronic control unit; and
   an electrical input connector configured to be connected with external electronic control means adapted to generate an input signal for stepper motors intended to move obturators of valve elements for controlling the flow of a fluid in a duct, wherein said input signal is adapted for positioning the obturators of the valve elements in a specific second position, said electronic interface module being configured to convert said input signal into an intermediate signal placed as input to said electronic control unit, said electronic control unit being configured to convert said intermediate signal into said output signal so that said specific first position corresponds to said specific second position,
   wherein said electronic interface module is configured to receive as input and convert into said intermediate signal two electrical current signals for driving a first phase and a second phase of bipolar stepper motors, said electrical current signals being of the Half-step, Full-step or Microstepping type,
   wherein said electronic interface module, to detect from said input signal the number of movement steps to be performed and the direction of execution of said movement to arrange said obturator in said specific second position, is configured to:
   set a step number variable to 0;
   generate, for said electrical current signal of each of said first phase and second phase, a square wave on two levels, a low level and a high level, the rising edges and the falling edges of said square waves being determined by the transient of each of said electrical current signals through the null value by a negative value and a positive value respectively;
   detect over time, for each predefined sampling period T, the level of said square waves, where said sampling period T is selected so that a sampling frequency 1/T is equal to or four-fold higher than the fundamental frequency of said electrical current signals;
   and for each sampling instant t, said electronic interface module is configured to:
   detect the value of the step based on the combination of the levels of said square waves at the sampling instant t and at the immediately preceding sampling instant t-T, the step is detected as x when the first phase is a high level H and the second phase is a low level L, the step is detected as x+1 when the first phase is the high level H and the second phase is the high level H, the step is detected as x+2 when the first phase is the low level L and the second phase is the high level H, and the step is detected as x+3 when the first phase is the low level L and the second phase is the low level L, where x is a variable whose value is selected from a set of integers Z,
   calculate a subtraction result of subtracting the step value at instant t with the step value at the immediately preceding instant t−T, wherein said subtraction result is set as as −1 when said substraction result is a positive value with an absolute value greater than 1 and said subtraction result is set as +1 when said result is a negative value with an absolute value greater than 1;
   set a required movement direction, wherein said required movement direction is set as a first movement direction selected from the two movement directions when said subtraction result is a positive number and said required movement direction is set as a second movement direction of the two movement directions when said subtraction result is a negative number; and
   increase said step number variable by one when the substraction result is a value other than 0.

2. The apparatus according to claim 1, wherein said intermediate signal has a specific value between a predetermined minimum value, associated with said first end position, and a predetermined maximum value, associated with said second end position, wherein said specific value represents, proportionally within said range, said specific second position.

3. The apparatus according to claim 2, wherein said specific value of said intermediate signal is a digital value between 0 value, associated with said first end position, and a predetermined maximum value, associated with said second end position.

4. The apparatus according to claim 2, wherein said intermediate signal is an analogue signal in electrical voltage and said specific value is a continuous electrical voltage value between the 0-Volt value, associated with said first end position, and a maximum predetermined electrical voltage value expressed in Volt, associated with said second end position.

5. The apparatus according to claim 1, wherein said electronic interface module is further configured to:

calculate an absolute position in steps, required for said obturator, by adding the value of said step number variable to the current absolute position in steps of said obturator previously stored by said electronic interface module in a step_current position variable taking into account said set movement direction;

update said step_current position variable;

obtain the value of said absolute position within said range between said predetermined minimum value and said predetermined maximum value, by dividing said value of said absolute position in steps by a conversion ratio R, calculated by dividing the maximum number of movement steps, controllable by said external electronic control means, by the maximum number of steps controllable by said electronic interface module.

6. The apparatus according to claim 5, wherein said electronic interface module is configured to detect said maximum number of movement steps controllable by said external electronic control means by performing said detection of said number of steps and of said movement direction when said external electronic control means perform an initialisation step that provides generating an input signal adapted to control a stepper motor for moving an obturator from said first end position to said second end position or vice versa.

7. The apparatus according to claim 1, wherein said apparatus includes an outer casing in which said electronic control unit, said electronic interface module and said servo-motor are contained.

8. The apparatus according to claim 1, wherein said obturator is a ball obturator.

9. A refrigeration or cooling system, comprising:

a duct for a refrigerant fluid; and electronic control means configured to generate an input signal for stepper motors intended to move valve element obturators for controlling the flow of said refrigerant fluid in said duct; wherein the refrigeration or cooling system comprises an apparatus according to claim 1, where said valve element of said apparatus is interposed along a section of said duct and said electronic interface module is connected by means of said electrical input connector with said electronic control means.

* * * * *